Dec. 14, 1943.　　　J. K. AIMAN　　　2,336,522
INJECTOR
Filed March 13, 1942　　　2 Sheets-Sheet 1
Fig. 1.
Fig. 2.
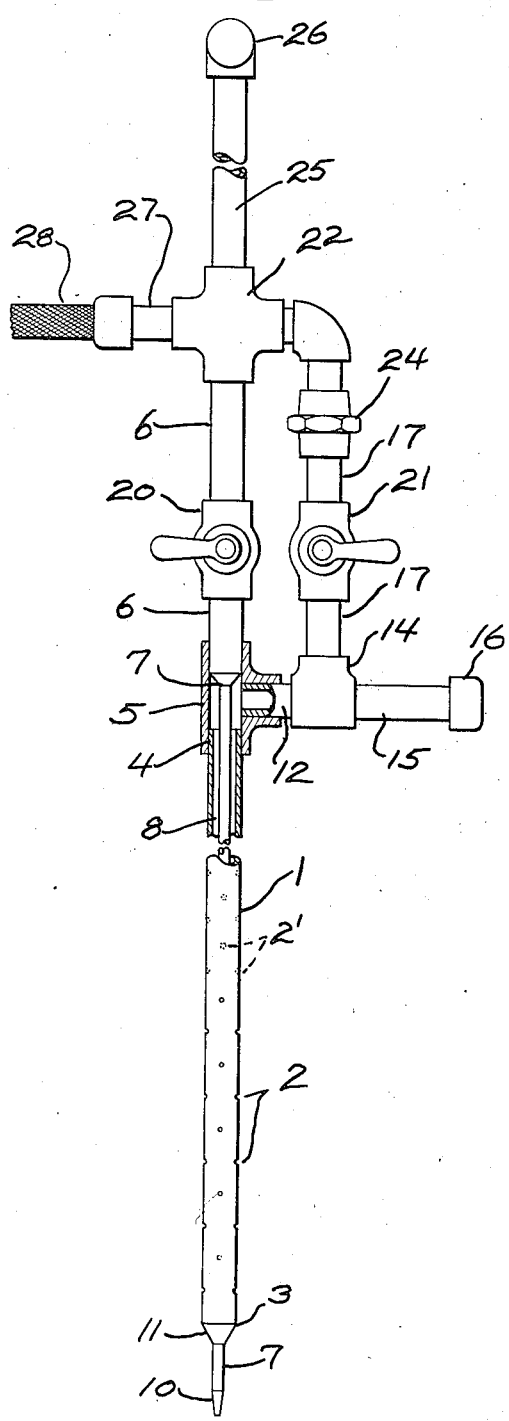
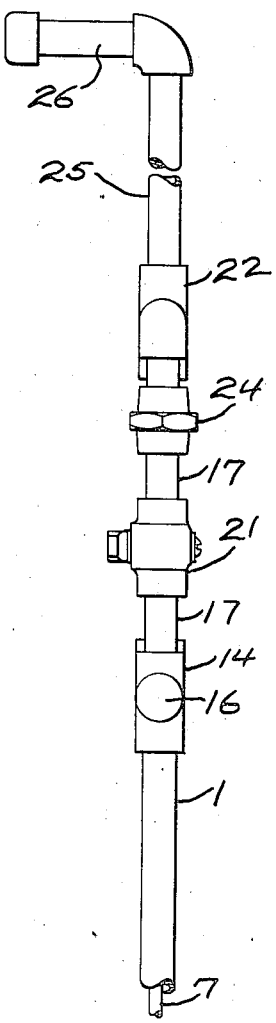
INVENTOR,
JAMES K. AIMAN.
BY
*Lippincott & Metcalf*
ATTORNEYS.

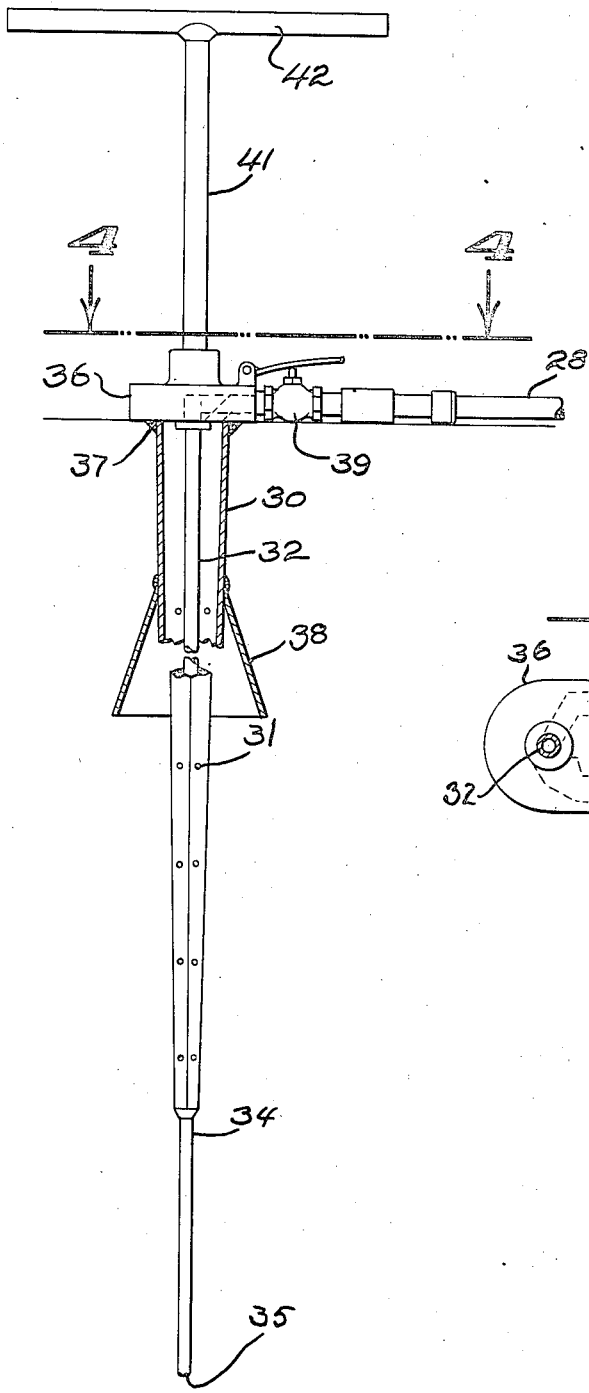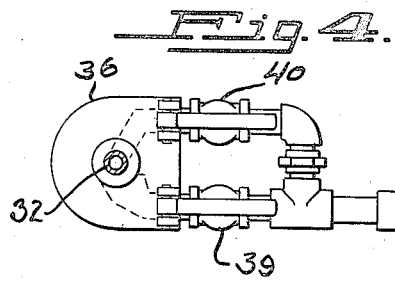

Patented Dec. 14, 1943

2,336,522

UNITED STATES PATENT OFFICE 2,336,522

INJECTOR

James K. Aiman, Livermore, Calif., assignor to Samuel L. Abbot, doing business under the name of S. L. Abbot Company, San Francisco, Calif.

Application March 13, 1942, Serial No. 434,474

9 Claims. (Cl. 47—49)

My invention relates to a means and method ideally adapted to inject weed killing or other liquids into the soil below the surface thereof.

In many parts of the country weeds, especially perennial weeds such as Johnson grass and wild morning glory, destroy the usefulness of a large amount of land that could be utilized to better advantage. Various weed killers have in the past been applied to the portions of such plants above ground, but in many cases a complete kill is not accomplished because the plants grow up again from deep seeded roots which have not been reached by the poison. It is, therefore, of great advantage to have the poison such as, for example, sodium arsenite, deposited in the ground well below the surface thereof so that the deeper roots of the weeds can absorb the poison. It is also advantageous, in order to obtain proper coverage of a field, when such poisons are injected below the surface of the ground, to obtain lateral distribution of the soil solution to the maximum extent. In addition any device to be utilized in a practical manner for injecting liquids into soil must be readily and easily progressed into the soil with a minimum of labor.

Among the objects of my invention are: To provide a tool for injecting liquids into the soil below the surface of the soil; to provide such a tool wherein wide lateral distribution of injected liquids can be obtained without substantial surface leakage; to provide a liquid injecting tool which is easily progressed into the ground by use of an advance hydraulic jet; to provide a tool for injecting liquids, such as weed killers or fertilizers, into the soil which can be readily progressed into the ground and thereafter utilized for injecting the liquid laterally adjacent the lower end only thereof; to provide a method of effectively covering wide areas with liquids injected beneath the surface of the soil; and to provide a simple means and method of injecting liquids into the soil beneath the surface thereof.

My invention may be more fully understood by direct reference to the drawings wherein:

Fig. 1 is a side view, mostly in elevation, and partly in section, of one form of tool by which my method can be accomplished.

Fig. 2 is a view in elevation taken at a right angle to the view of Fig. 1.

Fig. 3 is a side view mostly in elevation and partly in section of a modified construction of my invention.

Fig. 4 is a view partly in section and partly in elevation taken as indicated by the line 4—4 in Fig. 3.

Referring directly to the drawings, the portion of the tool to be inserted in the ground comprises an outer pipe 1 having lateral apertures 2 therein only for a short distance, such as six inches for example, adjacent the end 3 of the pipe to be progressed into the ground, or apertures, such as 2 and 2' extending all the way along pipe 1 may be provided. The opposite end 4 of the outer pipe is fastened to a T-fitting 5 which receives one end of a coaxial branch pipe 6. Within fitting 5, branch pipe 6 is connected, as by welding, to an inner pipe 7 extending preferably coaxially through outer pipe 1, and having an outer diameter less than the inner diameter of outer pipe 1 so that there will be a liquid space 8 between the inner and outer pipes.

Inner pipe 7 continues through the entire length of outer pipe 1 and extends through the lower end 3 to terminate in an open pointed end 10. End 3 of outer pipe 1 is then sealed to inner pipe 7 as by an end weld 11.

A laterally extending nipple 12 is fastened to T-fitting 5 and connected with a second T-fitting 14 carrying a laterally extended handle 15 closed by a cap 16. T-fitting 14 also connects with a second branch pipe 17 extending parallel to branch pipe 6. Valves 20 and 21 are inserted in branch pipes 6 and 17 respectively. Beyond the valves 20 and 21 the branch pipes are continued to enter a four-way pipe fitting 22, branch pipe 17 being preferably provided with a union 24 between valve 21 and fitting 22. A brace pipe 25 is projected beyond fitting 22, in alinement with branch pipe 7, and terminates in a closed right angle pipe bend 26 used as a shoulder brace. The remaining port of fitting 22 is provided with a hose fitting 27 to which a supply pipe or hose 28 may be attached.

In operation the tool when provided only with apertures 2 is utilized to inject liquid into the soil beneath the surface of the soil, particularly in a region below the surface of the soil where the injected liquid will have opportunity to come in contact with the deeper growing roots, particularly of perennial plants, when weed killing liquids such as, for example, sodium arsenite is supplied under pressure to the tool. In case other liquids such as, for example, fertilizer solutions are to be injected, the deep injection of the liquids make the solution available to the deeper roots of the plant such as trees, for example.

In any event, supply hose 28 is connected to a source of liquid under a pressure as, for example, of seventy pounds per square inch with both valves 20 and 21 closed. The device is then taken to center of the area it is desired to treat, handling the tool by means of hand grip 15 and shoulder brace 26, to position the tool upright over the soil with the point 10 engaging the ground. Liquid is then admitted only to inner tube 7 by operation of valve 20 thus causing a high velocity jet to issue from the open end 10 of the inner tube engaging the soil. Due to the fact that the inner tube 7 is of much smaller diameter than the diameter of the branch pipe, supply pipe 27 and hose 28, a high velocity jet will issue from end 10 directed downwardly. This high velocity advance jet flushes away the soil from the immediate vicinity of the lower end of the tool, and by exerting only slight downward pressure on the tool the tool is progressed rapidly into the ground until the proper depth has been reached, preferably with the hose 28 lying on the ground.

When this depth has been reached apertures 2 in the outer pipe 1 have been buried, and there is an effective seal between apertures 2 and the surface of the ground due to the remainder of outer pipe 1 filling the hole in which the tool now rests. After the apertures 2 have been sufficiently buried, and are in the proper position, valve 21 is operated to cause liquid to flow under pressure laterally from apertures 2, until the maximum lateral penetration has occurred. In the meantime it may also be desirable to maintain the lower jet from end 10 of the inner tube in operation as pressure developed in the soil by this jet aids in distributing the liquid.

After sufficient liquid has been injected, both valves 20 and 21 are closed and the tool is withdrawn. The tool is then moved to an adjacent spot, spaced from the first application by a distance sufficient to cause the treated areas to be closely adjacent or even overlap slightly, and the injection of liquid is repeated in the manner described. In this manner, by systematically treating a field area, substantially a 100% kill of perennial weeds can be obtained when using weed killing solutions, for example, or a substantially 100% fertilization of all deep roots in the field can be obtained when using liquid fertilizer solutions. The tool described herein has been found to adequately cover a deep lying area of sandy loam approximately six feet in diameter at each application with a solution pressure of only seventy pounds per square inch in the supply pipe. The liquid can be supplied by a tank and pump mounted on a moving vehicle and due to the fact that the penetration of the tool into the ground is exceedingly rapid due to the hydraulic action of the advance jet, treatment of large areas in a minimum length of time can be obtained. Kills, for example, when using weed killing solution, have been found to be particularly effective on such perennial plants as wild morning glory and Johnson grass, which have deep root systems. Practically all of the liquid is supplied to the deep lying roots of the perennial plants where it will be most effective, the weed killing treatment for example, is given below the point where adventitious growths can form from the roots. There is practically no loss of liquid in the upper layers of the soil where the liquid could only act satisfactorily on shallow rooting plants. A second type of use is accomplished when apertures 2 and 2' are both provided in pipe 1. Under these conditions the entire soil from the surface down can be saturated, thus treating both shallow rooted and deep rooted plants.

A modification to my invention is shown in Fig. 3 designed, for example, for saturation of the soil two feet deep but at least six inches below the surface. Further, this modification is so designed as to provide a surface seal to prevent chemicals being forced upwardly out of the hole.

Referring directly to this figure, an outer tapered pipe 30 is provided preferably square in section. Lateral holes 31 therein may extend from the end of the pipe to, for example, about six inches of the surface. An inner pipe 32 is provided within outer pipe 30 extending through the outer end thereof at weld 33 to terminate in advance end 34 having an end opening 35 as in the previous embodiment. Adjacent the top of outer square pipe 30 is positioned a collar 36 extending laterally and having a lower tapered portion 37. A conical skirt 38 is welded to outer pipe 30 just above holes 31, with the large end opening downwardly, and acts to prevent chemicals from shooting upwardly out of the hole made by the tool.

In this case I prefer to connect the hose 28 to the inside of the outer pipe 30 and at a right angle thereto through a spring valve 39 at the level of collar 36 and also to supply liquid to inner pipe 32 at the same level through a second spring valve 40. The device may be handled by a staff 41 extending upwardly from collar 36, this staff being provided with a handle 42 to progress the device into the ground.

The action of this modification is substantially identical with the first modification. It has been found, for example, when large amounts of liquid are to be injected, the hose 28 of the modification shown in Figs. 1 and 2 is quite heavy. Under certain circumstances the weight of the hose, being near the top of the injector, has a tendency to cause the injector to go into the ground at an angle or to tilt during injection. In the present modification the hose, when the tool is completely inserted in the ground, rests on the surface of the ground and therefore exerts no side pressure on the tool during the injection of the liquid.

It will thus be seen that there are three distinct and separate uses for the injector of my invention. (1) The entire soil from the surface down can be saturated. (2) The saturation can be made to take place at the lower six inches or so only. (3) The saturation can be made to take place, for example, up to at least six inches below the surface as shown in the second modification.

Furthermore, I have shown the modification of Fig. 3 as utilizing spring valves. I wish it to be understood that such type of valves may be utilized in either modification, if desired. In addition, it should be pointed out that in the second modification as shown in Fig. 3, a tapered injector is utilized, as it has been found that the tapered injector may be more easily removed from certain soils as the amount of energy necessary to remove the buried portion from the soil after the injection has taken place is reduced.

I claim:

1. A tool for injecting liquids in soil comprising an outer pipe having side wall apertures therein, an inner pipe of smaller diameter than the interior diameter of said first pipe positioned inside of said outer pipe and projecting through one end of said outer pipe to open beyond said end, said inner pipe being sealed to said outer pipe at both ends thereof, and means for separately supplying liquid from the same source to each of said pipes.

2. A tool for injecting liquids in soil comprising an outer pipe having side wall apertures therein, an inner pipe of smaller diameter than the interior diameter of said first pipe positioned inside of said outer pipe and projecting through one end of said outer pipe to open beyond said end, said inner pipe being sealed to said outer pipe at both ends thereof, a liquid supply pipe, separate branch pipes connecting said inner and outer pipes to said supply pipe, and a control valve in each of said branch pipes.

3. A tool for injecting liquids in soil comprising an outer pipe having side wall apertures therein, an inner pipe of smaller diameter than the interior diameter of said first pipe positioned inside of said outer pipe and projecting through one end of said outer pipe to open beyond said end, said inner pipe being sealed to said outer pipe at both ends thereof, a liquid supply pipe, separate branch pipes connecting said inner and outer pipes to said supply pipe, the cross section of said supply pipe and said branch pipes being of greater area than the cross sectional area of said inner pipe to increase liquid velocity therein, and a control valve in each of said branch pipes.

4. A tool for injecting liquids in soil comprising an outer pipe having side wall apertures therein, an inner pipe of smaller diameter than the interior diameter of said first pipe positioned inside of said outer pipe and projecting through the end of said outer pipe adjacent one end thereof to open beyond said end, said inner pipe being sealed to said outer pipe, separate branch pipes connecting said inner and outer pipes to a common supply pipe, the cross sectional area of said supply pipe and the branch pipe supplying said inner pipe being greater than the cross sectional area of said inner pipe to provide a high velocity jet at the open end of said inner pipe.

5. Apparatus in accordance with claim 2 wherein a hand grip is provided attached to one of said branch pipes.

6. Apparatus in accordance with claim 2 wherein said tool is provided with a laterally extending hand grip adjacent the junction of a branch pipe and said outer pipe, and wherein a shoulder brace is provided adjacent the junction of said supply pipe and said branch pipes.

7. Apparatus in accordance with claim 2 wherein said outer pipe increases in diameter from the projecting end of said inner pipe to the connection of said branch pipes to said inner and outer branch pipes.

8. Apparatus in accordance with claim 2 wherein said outer pipe is of square section.

9. Apparatus in accordance with claim 2 wherein said liquid is supplied to said inner and outer pipes at a right angle to the extent of said pipes and at a level adjacent the upper junction of said pipes whereby said supply pipe will rest on the ground surface when said tool is fully inserted in the ground.

JAMES K. AIMAN.